T. E. TILDEN.
Measuring Garments.
No. 1,880. Patented Dec. 5, 1840.
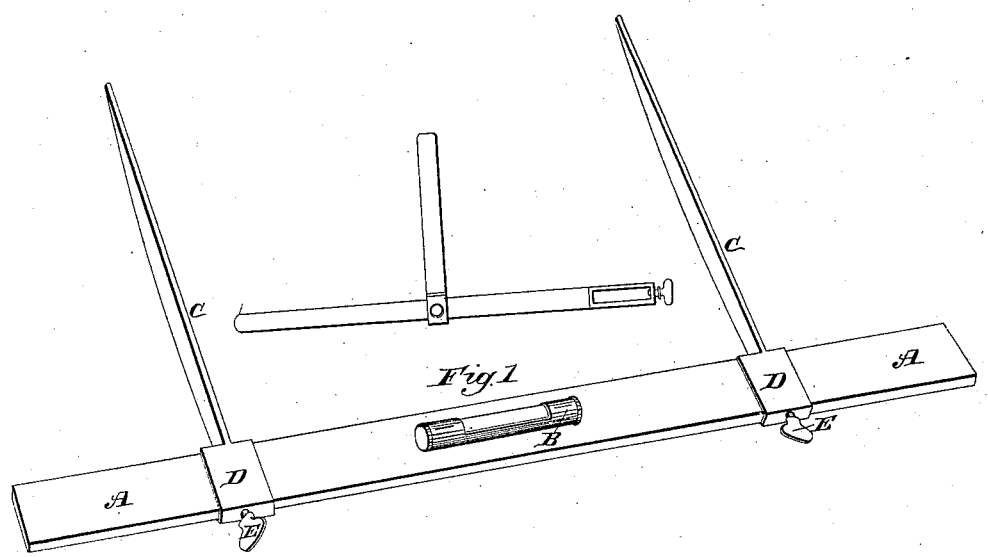
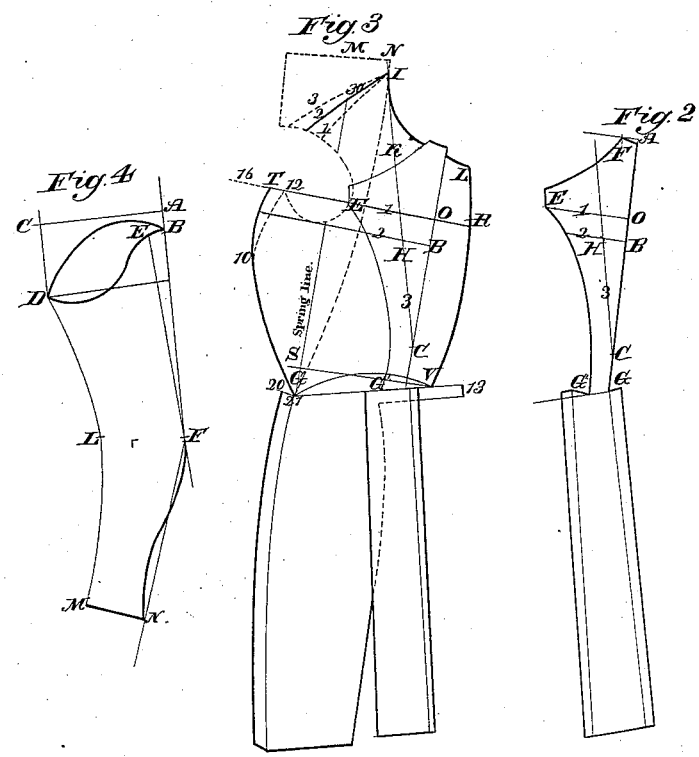

UNITED STATES PATENT OFFICE.

THOMAS E. TILDEN, OF BALTIMORE, MARYLAND.

MODE OF MEASURING THE HUMAN BODY FOR THE DRAFTING AND CUTTING OF COATS.

Specification of Letters Patent No. 1,880, dated December 5, 1840.

*To all whom it may concern:*

Be it known that I, THOMAS E. TILDEN, of the city of Baltimore, in the State of Maryland, have invented certain improvements in the manner of taking measure of the human body for the purpose of drafting and cutting coats in such a way as to insure a perfect fit, my first improvement consisting in a simple instrument which I denominate "Tilden's daguerreotype or transfer ruler," and my second improvement consists in the manner or system of applying the common tape measure, divided into inches and parts of inches, so as to draft and cut from a point or points ascertained by the transfer ruler, which system of measuring I denominate "Tilden's balancing system"; and I do hereby declare that the following is a full and exact description thereof.

My transfer ruler is represented in the accompanying figure.

It consists simply of a straight strip of wood, in the form of a flat ruler, having a spirit level fixed in the middle, or on any other convenient part of one of its flat sides, and also having two sliding arms which project out from said flat ruler at right angles; and by the use of this, and of the ordinary measuring tape, all the required measures are obtained.

A, A, is the ruler part which may be two feet long, and an inch and a half wide.

B, is a spirit level affixed on one of its flat sides.

C, C, are two arms, or spears of metal, which project out from it at right angles, to the distance of about a foot; upon the inner ends of these are the sockets D, D, within which the ruler slides, and which are confined in place by means of the thumb screws E, E. On one of the arms C, C, I usually place a sliding arm F, which, when the instrument is used, stands vertically against the front of the arm. This constitutes the whole instrument, it not being necessary that there should be any graduations thereon, or any measuring tape affixed thereto; its use is to obtain a point on the middle of the back which shall be precisely in a line with the scye, or under side of the arms; it is applied in the following manner.

The person to be measured is to stand up in a natural and easy position, and the instrument is then applied by passing its arms under the arms of the person, the ruler crossing his back; the arms of the instrument are adjusted to the width of the person and are affixed in place by means of the thumb screws, and the vertical arm F, adjusted to the front of the arm. It is to be pressed up closely under the arms, and, if the shoulders are of equal height, the bulb of the spirit level will stand in its center; when this is the case a mark is to be made on the middle of the back of the person, coinciding with the upper side of the ruler; and from the point, thus ascertained, all the measures, so far as they appertain to my system are to be determined. Should the spirit level indicate a deviation from a horizontal line, this will prove that one shoulder, or arm, is higher than the other; and when this is the case, the arm of the instrument, on the lower side, is to be removed, and the level of the highest side ascertained and marked, the arm which was removed is then to be replaced and the level of the lower side in like manner ascertained and marked, which will give two points on the back seam indicating, respectively, the heights of the scye on each side from which points the subsequent measures are to be taken. The ruler is not further required, the remaining measures being taken by the measuring tape; as the exact fit of the coat is dependent upon the point, or points, thus ascertained by the ruler, special care must be taken in obtaining these. Where two points are obtained they are to be used in drafting on the sides to which they respectively appertain. In using the measuring tape I proceed in the following order, deeming it most convenient to do so, although it will be manifest that this order may be departed from without changing the system by which I am governed.

Having provided a proper book, which should be alphabetically arranged, for entering the measures as they are obtained, I take the graduated tape, and measure from the socket bone down to the mark made on the back, and note this down, which we will suppose to be 7½ inches. I then, from said mark, measure for the length of waist say 16½ inches; this length will, of course, be varied according to the fancy and habits of the person to be fitted. I then get the length of coat, say 37 inches. I then take the measure for the length of the arm in the following manner. The person is to raise his arm so that the elbow will be nearly level with the top of the arm, which is to be bent so as to cause the hand to approach the face; the sleeve measure is then to be taken by first measuring from the center of the back to the elbow, say 22 inches; then the length to the hand, say 34 inches. I then measure from the socket bone down in front, for the length of lapel, say 22 inches. I now take what I denominate my first shoulder, or proof measure, which is from the socket bone, over the shoulder, around under the arm, and back to the socket bone, say 26½ inches. Secondly, I measure from the mark on the center of the back directly opposite to the scye, over the shoulder, around under the arm, and back to the starting point, say 27 inches, which I denominate the second shoulder measure. I then take my third shoulder or blade measure, by measuring from the socket bone, over the shoulder, and around under the arm, to the mark made on the center of the back for the bottom of the scye; this will bring the measure over the most prominent part of the shoulder blade, and may be 22½ inches. I then take the measure around the top of the arm, close up to the shoulder, which serves to prove the scye and may be 16 inches. I next take what I call my balance measure which is from the socket bone, over the shoulder and down to the point marked for the length of waist, say 23½ inches, which affords the only correct mode of bringing a coat in at the waist. I then take the breast and waist measure as usual, say 36, and 32 inches. The numbers, as entered in the book, will then stand 7½, 16, 37, 22, 34, 22½, 26½, 27, 22½, 16, 23½, 36, 32. In taking these measures, although great exactitude is required, the judgment must be exercised according to the taste and habits of the person to be fitted. For one who is fashionable, and requires a close fit, there will be no allowance beyond the measures, which, in this case, must be taken tight; for others a due and equable allowance must be made. For the size of the sleeve the arm should be measured around, above, and below, the elbow, and at the hand, an allowance of from half to three quarters of an inch being made, according to circumstances. After having obtained these measures they are to be applied for the purpose of drafting and cutting in the following manner: For the back as shown in Fig. 2, I draw a line straight with the edge of the cloth where I intend taking out the back and square the top, as shown at A; I then measure out the width I intend for the top of the back, as to F. For this width there is not any fixed rule, it being varied according to fashion, or fancy. From A, I mark down for the bottom of the scye as at B, and for the length of the waist as at G; at the length of the waist I make an offset of an inch and a half, or two inches, and draw a line from A to G for the back seam. I make the distance from A to B for the bottom of the scye; as obtained by means of the instrument, Fig. 1, and square this line 2, by the back seam; I then draw line 1, parallel to line 2, and at any preferred distance between 2, and A. This line is to obtain the top of the side seam on the fore part. Although this distance is indeterminate I would advise the cutter not to place it more than an inch and a half above line 2, as this will make a handsome point on the fore part at the top of the side seam.

If the person to be fitted is very round shouldered the line 2, will be proportionately low down; in this case a wide back scye should be made, so as to make the shoulder strap narrow, for persons so formed cannot wear a wide shoulder strap. From O to E, on line 1, is one-third and one twenty-fourth of the second shoulder measure. The width of the back scye is determined according to fashion or fancy; but when the person is round shouldered a wide back scye should be given. I sweep the side seam by the length of waist, and the shoulder seam by half its length. The width of the back at bottom is to be governed by the fashion. After drafting, and before cutting the back out, I measure down from A to C, two-thirds, and a half, of first shoulder measure. From B to H, on line 2, I go out one-eighth of first shoulder measure; I then draw line 3, from C, through H. This is to balance the coat and it should therefore be very carefully drawn; the use of this line will be apparent in describing, Fig. 3.

*Forepart.*—After cutting out the back I place it on any suitable part of the cloth where I mean to cut the forepart laying it as shown on the diagram Fig. 3, and, of course, so as to cut the cloth to the best advantage. When so placed I extend line 3, up as far as is necessary to give the shoulder point as at I, and extend lines 1, and 2 across the cloth, as represented. Then from O, to T, I measure out two thirds of the second shoulder measure; then up from H, to N, one third, and a half, and one fourth, of the first shoulder measure. From E, to R, is one third and a half of the breast measure; this is the only place where the breast measure is used. I then take the distance from E, to G', on the back, and sweep line 10, for the bottom of side seam at G on the fore part making a center or pivot at T then I get my balance measure from N to G', shown by dotted lines to extend to G on forepart. I then take the distance from T to G on the forepart, and sweep the side seam. Then placing my left hand at B, I with the right hand sweep the shoulder seam from I, which gives line 2. I then take the distance from I to C I place the left hand on line 1, as at 16, on its dotted extension, and with the right hand sweep upward from R to L; then go up from H, to K, one third and one twenty fourth of the first shoulder measure; I square K out by line 3, so as to touch the sweep at L, and make a dot; this will give a correct height for the neck gore. The neck gore is formed from L to I. From N to M, I take one eighth of the second shoulder measure, and draw the spring line from the point M to G on the forepart, this will always give a correct spring. Then I measure from N to V, for the length of lapel; for the distance from G to S I take one half third of the waist measure and draw a line from S to V, for the hollow or curve of the waist.

Before I cut the forepart I take care that all the proof measures are correct. Having also correctly obtained my balance measures, I next get my blade or third shoulder measure, chalk a dot at the most prominent part of the shoulder blade, as at 10, on the side seam; having marked this correctly, if it extends beyond the sweep for the side seam I make a dot, and then try my first shoulder measure; in some cases, as when the person has large shoulder blades, I find it an inch, more or less, larger than I want it, and if so, I bring in my back, as at 12, until it suits; this proof measure shows that the defect is at the top of the person's arm. After having obtained the first shoulder measure correctly, from the side seam as shown in the diagram, if it is found necessary to come in as at 12, I advance the part E, or the front of the scye, half that distance; if, for example I come in half an inch I then advance the front of the scye one fourth of an inch, I then try the scye measure and this must give one inch less than the actual measure, thus, for example, should the person measure 16 inches, the scye should be cut 15 inches. Should the scye, for instance, measure full 16 inches, I take one inch off from it, as shown by the dotted line 1, starting from 30; when this is necessary it shows that the person droops on the arm head. Should the scye measure only 14 inches, an inch must be added to it, as indicated by the dotted line 3. By careful attention to the variations as indicated by the lines 1, 2, and 3, on the diagram, and measuring and cutting in accordance with the rules here given, a perfect fit will be obtained whatever may be the shape of the person. The measures and parts of measures, as herein named, are things well understood by cutters.

Although the foregoing includes everything that is absolutely necessary to the carrying out of my system, and every skilful tailor will be able to understand, and apply it without further explanation, I will here give the directions for cutting the sleeve, in the manner which I have found to produce the best results, as this is a very important part, and one in which a failure will destroy the fit, however well the other parts may have been managed. To draft the sleeve, I measure around the scye, and take the half of that measure, and with it measure out from A, to C, in a line square with A, F. Then take the distance from T, to E, on the forepart, and from C, lay down this measure to D; then from A go down one twenty fourth of the second shoulder measure, to make the point B, after this the sleeve head may be formed from B to D, by the eye, or it may be sweep from a line drawn square to D; if this plan is used there must be a portion taken off from the round on the sleeve head, as shown on the diagram. For the under side of the sleeve, it is a good plan to take one half of the scye, as this will give it with great certainty. E, is the top of the under sleeve seam, and from B, to E, is one eighth of the second shoulder measure; and to get the length of the sleeve to the elbow and the hand, place the back at B. The size of the sleeve must be governed by the actual measurement, as there is no general rule for this; to the measure of this part as taken at L, F, for the elbow, and at M, N, for the hand, half an inch or more must be allowed to meet the wishes of the person to be fitted.

Having thus fully described the nature of my invention, and shown the manner of carrying the same into operation, what I claim therein as new, and desire to secure by Letters Patent, is—

1. The manner of constructing and using the instrument which I have called the transfer ruler, for obtaining a point on the back of the person to be fitted, which shall be in the same horizontal line with the under part of the arms, and for obtaining two such points where the arms, or shoulders, are of unequal height, from which point or points, the principal measures, constituting my balancing system are to be taken.

2. The manner of taking what I have called my second shoulder measure, by the aid of said point or points; also the manner of taking my third shoulder measure, as related to, and employing the said point, or points; and lastly, I claim the manner in which I take what I have herein called my balance measure, and of using the same in drafting for the purpose of cutting, so as to test and balance the respective measures obtained by the mark, or marks on the middle of the back; the whole being used substantially in the manner, and for the purpose herein set forth, and constituting a system of measuring and drafting which is entirely new, easy in its application, and accurate in its results.

THOMAS E. TILDEN.

Witnesses:
G. W. MORLING,
JAS. B. WAIGHTSON.